United States Patent
Madathikandam et al.

(10) Patent No.: US 12,430,265 B2
(45) Date of Patent: Sep. 30, 2025

(54) HYBRID MICROPROCESSOR AND PROGRAMMABLE LOGIC DEVICE (PLD)-BASED ARCHITECTURE INCLUDING INTER PROCESSOR COMMUNICATION

(71) Applicant: Hamilton Sundstrand Corporation, Charlotte, NC (US)

(72) Inventors: Rajesh Madathikandam, Karnataka (IN); Robin David Hill, Solihull (GB); Stephen Potter, Nuneaton (GB); Ashish Vijay, Rajasthan (IN); Rajeeva Krishna, Bangalore (IN); Anitha Thangavel, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 188 days.

(21) Appl. No.: 18/475,829

(22) Filed: Sep. 27, 2023

(65) Prior Publication Data
US 2024/0362173 A1    Oct. 31, 2024

(30) Foreign Application Priority Data
Apr. 25, 2023  (IN) .............................. 202311029885

(51) Int. Cl.
*G06F 13/12*  (2006.01)
*G06F 11/10*  (2006.01)
*G06F 13/16*  (2006.01)

(52) U.S. Cl.
CPC ........ *G06F 13/124* (2013.01); *G06F 11/1004* (2013.01); *G06F 13/1668* (2013.01)

(58) Field of Classification Search
CPC .............. G06F 13/124; G06F 11/1004; G06F 13/1668; G06F 13/12; G06F 30/34;
(Continued)

(56) References Cited

U.S. PATENT DOCUMENTS 6,891,397 B1   5/2005  Brebner
7,130,942 B2  10/2006  Gemelli et al.
(Continued)

FOREIGN PATENT DOCUMENTS

CN   109614351 B   5/2022

OTHER PUBLICATIONS

European Search Report for Application No. 24168451.3, mailed Oct. 1, 2024, 12 pages.

*Primary Examiner* — Tim T Vo
*Assistant Examiner* — Richard B Franklin
(74) *Attorney, Agent, or Firm* — CANTOR COLBURN LLP

(57) ABSTRACT

A microprocessor-PLD hybrid architecture includes an IPC microprocessor and a PLD in signal communication with the IPC microprocessor via an IPC interface. The IPC microprocessor outputs a data read command to initiate a data read operation or a data write command. The PLD includes a plurality of PLD modules that store data and a bus controller. The bus controller communicates with the plurality of PLD modules via a plurality of PLD interfaces and is configured to sequentially execute a set of bus controller instructions. The bus controller reads data from a target PLD module from among the plurality of PLD modules in response to receiving the data read command, and transfers the data to the IPC microprocessor. The bus controller receives data from the IPC microprocessor and stores the data in a target PLD module from among the plurality of PLD modules in response to receiving the data write command.

20 Claims, 6 Drawing Sheets

(58) Field of Classification Search
CPC .... G06F 30/30; G06F 30/347; G06F 13/1652; G06F 15/163
See application file for complete search history.

(56) References Cited

U.S. PATENT DOCUMENTS

| | | |
|---|---|---|
| 7,373,450 B2 | 5/2008 | Kamegawa |
| 7,406,557 B2 | 7/2008 | Dao et al. |
| 7,509,614 B2 | 3/2009 | Hwang et al. |
| 7,865,698 B1 | 1/2011 | Purcell et al. |
| 8,006,021 B1 * | 8/2011 | Li .................. G06F 13/4059 710/110 |
| 8,675,681 B2 * | 3/2014 | Hill .................. H03K 19/17744 326/38 |
| 9,934,175 B2 | 4/2018 | Kumar A V et al. |
| 2013/0332633 A1 | 12/2013 | Carney et al. |
| 2016/0350002 A1 | 12/2016 | Vergis et al. |

* cited by examiner

HYBRID MICROPROCESSOR AND PROGRAMMABLE LOGIC DEVICE (PLD)-BASED ARCHITECTURE INCLUDING INTER PROCESSOR COMMUNICATION

CROSS-REFERENCE TO RELATED APPLICATIONS

This application claims the benefit of Indian patent application No. 202311029885 filed Apr. 25, 2023, the disclosure of which is incorporated herein by reference in its entirety.

BACKGROUND

The present disclosure relates to electrical systems and, in particular, to an electrical system having programmable logic devices (PLDs) with a non-standard bus controller-based PLD architecture.

A bus controller-based PLD device can have a bus as well as programmable logic device (PLD) modules attached to the bus and a bus controller. The bus controller may have bus control logic, interface logic, input multiplexing logic and memory pages. Together, these features of the bus controller allow for management of multiple functionalities of the PLD modules.

SUMMARY

A microprocessor-PLD hybrid architecture includes an IPC microprocessor and a PLD in signal communication with the IPC microprocessor via an IPC interface. The IPC microprocessor outputs a data read command to initiate a data read operation or a data write command. The PLD includes a plurality of PLD modules that store data and a bus controller. The bus controller communicates with the plurality of PLD modules via a plurality of PLD interfaces and is configured to sequentially execute a set of bus controller instructions. The bus controller reads data from a target PLD module from among the plurality of PLD modules in response to receiving the data read command, and transfers the data to the IPC microprocessor. The bus controller receives data from the IPC microprocessor and stores the data in a target PLD module from among the plurality of PLD modules in response to receiving the data write command.

In accordance with additional or alternative embodiments, the bus controller-based PLD architecture further includes at least one of the plurality of PLD modules operates as an IPC PLD module configured to communicate directly with the IPC microprocessor and the bus controller, while remaining PLD modules among the plurality of PLD modules indirectly communicate with the IPC microprocessor.

In accordance with additional or alternative embodiments, the bus controller transfers data from the target PLD module to the IPC PLD module according to the data read command and transfers data from the IPC PLD module to the target PLD module according to the data write command.

In accordance with additional or alternative embodiments, the bus controller executes a command sequence in response to receiving trigger event from a given PLD module among the plurality of PLD modules.

In accordance with additional or alternative embodiments, executing the command sequence includes sequentially executing each command included in the command sequence according to a command execution rate.

In accordance with additional or alternative embodiments, the IPC interface operates at an IPC interface rate, and the command execution rate is greater than the IPC interface rate.

In accordance with additional or alternative embodiments, the IPC microprocessor outputs a read acknowledgement signal to the target PLD module in response to successfully receiving the first data, and wherein the target PLD module outputs a write acknowledgement signal to the IPC microprocessor in response to successfully storing the second data.

In accordance with additional or alternative embodiments, the IPC microprocessor outputs the second data to the target PLD module in response to initiating the data write operation, and wherein the target PLD module outputs the first data and error correcting encoded data corresponding of the first data to the IPC microprocessor in response to initiating the data read operation.

In accordance with additional or alternative embodiments, in response to initiating the data read operation the IPC PLD module delivers data from the bus controller module and error correcting encoded data to the IPC microprocessor; and in response to initiating the data write operation the IPC PLD module delivers the second data from the IPC microprocessor to the bus controller.

In accordance with additional or alternative embodiments, in response to initiating the data read operation the bus controller delivers the first data from target PLD module to the IPC PLD module, and delivers the read acknowledgement signal from the IPC PLD module to the target IPC PLD module; and in response to initiating the data write operation the bus controller delivers the second data from the IPC PLD module to the target PLD module, and delivers the write acknowledgement signal from the target PLD module to the IPC PLD module.

According to another non-limiting embodiment, a method of controlling a microprocessor-PLD hybrid architecture is provided. The method comprises outputting, from an inter-processor communication (IPC) microprocessor, one of a data read command configured to initiate a data read operation to obtain first data, or a data write command configured to initiate a data write operation to store second data, and arranging a plurality of individual PLD modules in a programmable logic device (PLD) in signal communication with the IPC microprocessor via an IPC interface. The method further comprises sequentially executing a set of bus controller instructions by the bus controller and exchanging data between a bus controller and the plurality of PLD modules via a plurality of PLD interfaces in response to executing the instructions. in response to receiving the data read command, reading, by n the bus controller, first data from a target PLD module from among the plurality of PLD modules and transferring the first data to the IPC microprocessor; and in response to receiving the data write command, receiving, by the bus controller, the second data from the IPC microprocess and storing the second data in a target PLD module from among the plurality of PLD modules.

In accordance with additional or alternative embodiments, the method further includes operating at least one of the plurality of PLD modules as an IPC PLD module configured to communicate directly with the IPC microprocessor and the bus controller, while remaining PLD modules among the plurality of PLD modules indirectly communicate with the IPC microprocessor.

In accordance with additional or alternative embodiments, the method further includes transferring data by the bus controller transfers data from the target PLD module to the IPC PLD module according to the data read command; and transfers data by the bus controller from the IPC PLD module to the target PLD module according to the data write command.

In accordance with additional or alternative embodiments, the method further includes executing, by the bus controller, a command sequence in response to receiving trigger event from a given PLD module among the plurality of PLD modules.

In accordance with additional or alternative embodiments, executing the command sequence includes sequentially executing each command included in the command sequence according to a command execution rate.

In accordance with additional or alternative embodiments, the method further includes operating the IPC interface at an IPC interface rate, wherein the command execution rate is greater than the IPC interface rate.

In accordance with additional or alternative embodiments, the method further includes outputting, by the IPC microprocessor, a read acknowledgement signal to the target PLD module in response to successfully receiving the first data; and outputting, by the target PLD module, a write acknowledgement signal to the IPC microprocessor in response to successfully storing the second data.

In accordance with additional or alternative embodiments, the method further includes further comprising outputting, by the IPC microprocessor, the second data to the target PLD module in response to initiating the data write operation; and outputting, the target PLD module, the first data and error correcting encoded data corresponding of the first data to the IPC microprocessor in response to initiating the data read operation.

In accordance with additional or alternative embodiments, the method further includes delivering data from the bus controller module and error correcting encoded data to the IPC microprocessor in response to initiating the data read operation the IPC PLD module; and delivering the second data from the IPC microprocessor to the bus controller in response to initiating the data write operation the IPC PLD module.

In accordance with additional or alternative embodiments, the method further includes in response to initiating the data read operation the bus controller delivers the first data from target PLD module to the IPC PLD module, and delivers the read acknowledgement signal from the IPC PLD module to the target IPC PLD module; and in response to initiating the data write operation the bus controller delivers the second data from the IPC PLD module to the target PLD module, and delivers the write acknowledgement signal from the target PLD module to the IPC PLD module.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
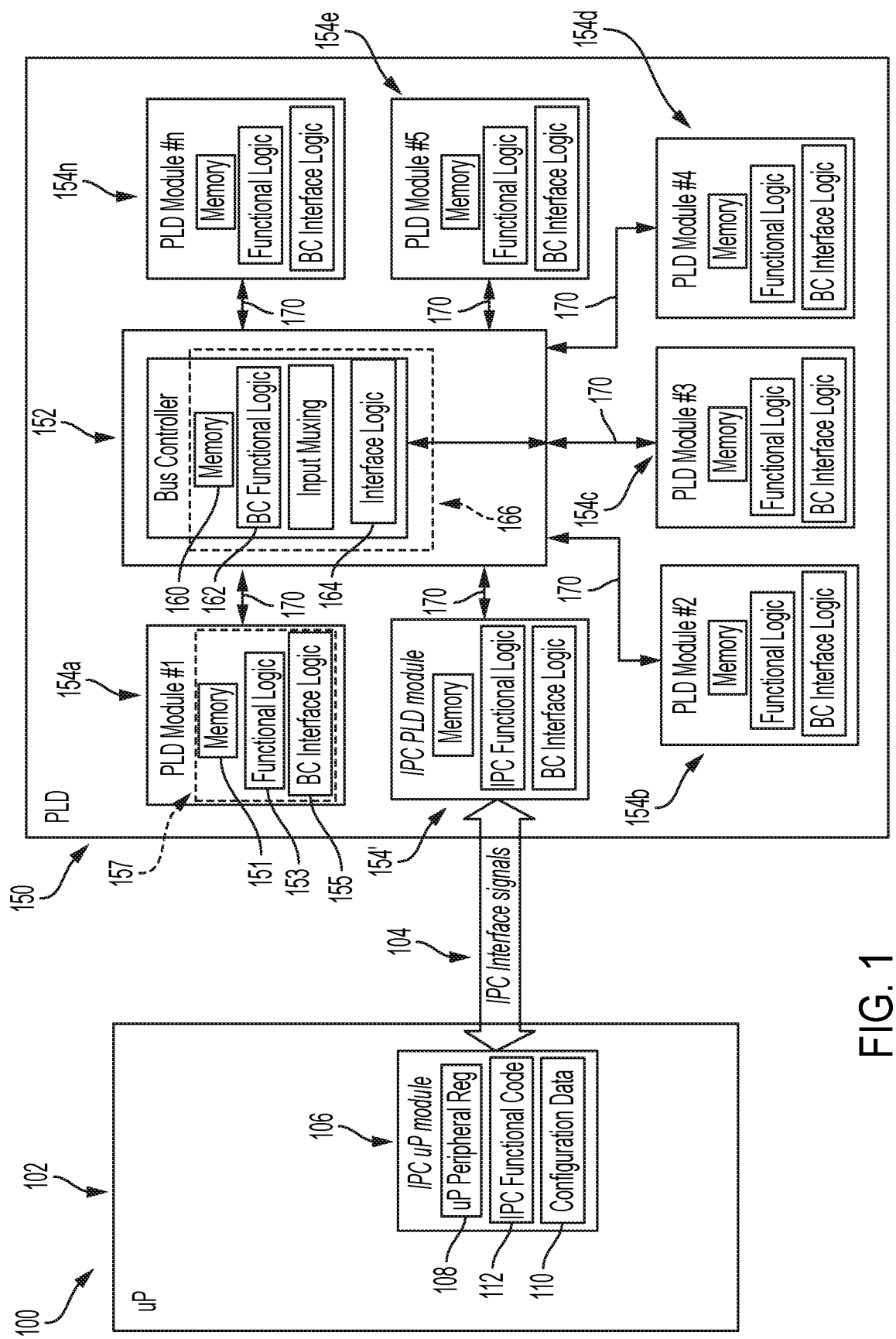
FIG. 1 is a block diagram illustrating a microprocessor-PLD hybrid architecture according to a non-limiting embodiment of the present disclosure.

Programmable Logic Devices (PLDs) are typically designed to contain a set of functional blocks which can be termed as PLD building blocks, which are interconnected to each other based on the data and control flow requirements. The type of interconnections between these building blocks could be unique between any two functions, and some PLD functions may have incoming and outgoing data and control flow to every other function. This design complicates the development and maintenance of these building blocks. Even if these building blocks are made as re-usable IP libraries, it may be necessary to creating minor or major variants of these building blocks for different applications. The need to change or modify these building blocks on application basis restricts the plug and play, "modularity", and re-use of these building blocks in a PLD architecture, and in turn impacts the cost and schedule of the PLD designs.

Various aerospace applications utilize hybrid processing device architectures, which include a sequential processing microprocessor (µP) and parallel processing Programmable Logic devices (PLDs) with suitable system functionality allocation to each processing device. The microprocessor utilizes a PLD as an extended external processing device with a primary-secondary concept for command and data exchange between the microprocessor and the PLD to realize overall system functionality.

One or more non-limiting embodiments provides a microprocessor-PLD hybrid architecture, which achieves PLD functionality by interconnecting a bus controller (BC) module and multiple parallel functioning PLD. "One or more non-limiting embodiments provides a microprocessor-PLD hybrid architecture, which achieves PLD functionality by interconnecting a bus controller (BC) module capable of executing a BC command sequence and multiple parallel functioning PLD modules. The BC Sequence can be pre-loaded in a given PLD functional module and/or stored in externally interfaced memory devices which will be accessed and executed by the PLD functional module during operation. In case of a primary-secondary µP-PLD-based hybrid any command or data value required by a secondary PLD is provided by the primary µP over an inter-processor communication (IPC) interface. According to a non-limiting embodiment, the BC module transfers the data between the PLD functional modules as per the BC Sequence. The BC Sequence can be developed using set of periodically executing custom BC commands to implement the PLD functionality.

In one or more non-limiting embodiments of the disclosure, a bus controller-based paged memory architecture provides the following technical advantages: (1) guaranteed IPC data transfer between primary and secondary, as the set execution and repetition rate of BC sequence including reading of IPC PLD module generated BC command is very much higher when compared to IPC interface speed; (2) low latency in communicating successful command/data exchange, as the proposed IPC protocol acknowledges successful reception/transmission of command/data word immediately after each IPC command/word transfer; (3) a reduced number of IPC command bits, which increases payload bits in each IPC command word; (4) generates equivalent BC command in reference to read/write operation in IPC PLD module, rather than generated the BC command as part of IPC command; (5) The microprocessor IPC module implementation is immune to change in BC command as the BC command is not part of the IPC command in reference to read/write operation; (6) can utilize a standard microprocessor interface peripheral to provides a flexible, reusable, and scalable of the IPC architecture to any microprocessor and PLD modules; and (7) the architecture can be extended to single primary microprocessor with multiple secondary PLDs or single primary PLD module with multiple secondary PLD modules.

With reference now to FIG. 1, a microprocessor-PLD hybrid architecture 100 according to a non-limiting embodiment of the present disclosure. The microprocessor-PLD hybrid architecture 100 includes an IPC microprocessor 102 and a PLD 150. The microprocessor 102 and the PLD 150 are in signal communication with one another via an IPC interface 104 to implement an IPC protocol that achieves seamless, high-data integrity, robust command-data exchange. Although single primary microprocessor-to-secondary PLD architecture is shown in FIG. 1, it should be appreciated that other embodiments can employ a primary PLD-to-secondary PLD architecture without departing from the scope of the invention. In such an architecture, a single primary PLD provides the IPC primary functionality while the remaining secondary PLDs provide the secondary IPC functionalities.

The IPC microprocessor 102 includes an IPC µP module 106, µP peripheral registry 108, functional code 110, and configuration data 112. The IPC µP module 106 is configured to control the IPC microprocessor 102 and facilitate data exchange with the PLD 150. The peripheral registry 108 includes a plurality of individual registers configured to read or write multiple bits at a time. Each register is assigned an address to select a particular register at which to read or write data. The configuration data 110 can include, for example, code that configures specific registers included the peripheral registry 108, the functional code 112 can include code that performs command-response based read-write sequence as per the IPC protocol of the IPC µP module 106.

According to a non-limiting embodiment, the IPC µP module 106 is implemented as µP engine or an inbuild µP standard interface controller capable of executing the peripheral registry 108, configuration data 110, and functional code 112 stored in the memory of the IPC microprocessor 102. For example, the IPC µP module 106 includes an interface peripheral controller including, but not limited to, a serial peripheral interface (SPI) controller, an inter-integrated controller (I2C) controller, a parallel interface controller, and a serial communications interface (SCI) controller.

The PLD 150 includes a bus controller 152 (also referred to as a BC PLD module 152) in signal communication with one or more PLD modules 154a-154n via a plurality of respective PLD interfaces 170. Although seven PLD modules 154a-154n are illustrated, it should be appreciated that the PLD 150 can include more or less PLD modules without departing from the scope of the present disclosure. Any of the Bus controller 152 and/or the PLD modules 154a-154n can be implemented as a controller including a processor configured to execute software instructions and/or logic stored in memory. In addition, one of the PLD modules 154a-154n can operate as a primary PLD module 154' which perform primary IPC functionalities, while the remaining PLD modules 154a-154n which perform primary IPC functionalities, as described in greater detail below.

The Bus controller 152 utilizes the plurality of PLD interfaces 170 and interface logic to establish a communication interface with all the PLD modules 154a-154n. According to a non-limiting embodiment, the Bus controller 152 includes a BC engine 166, which supports a bus controller (BC) memory unit 160, bus BC functional logic 162, and configurable PLD module interface logic. The BC memory unit 160 includes a plurality of individual memory locations. Each memory location is assigned a unique address and is configured to store data (e.g., 32 bits). The BC functional logic 162 can perform various functional operations on data stored in the BC memory unit 160 such as, for example, various arithmetic and/or computational operations associated with a PLD application and/or I/O device type, data encoding/decoding, etc. According to a non-limiting embodiment, The BC memory unit 160 includes a plurality of individual memory locations. Each memory location is assigned a unique address and is configured to store data (e.g., 32 bits) and bus controller operation specific data. The BC functional logic 162 can perform various functional operations on data stored in the BC memory unit 160 such as, for example, data transfer between PLD modules, triggering bus sequence execution per event trigger from PLD modules. The PLD module interface logic 164 provides the PLD module information pertaining to a target PLD module 154a-154n, including interface input and/or output addresses, data and read/write timing parameters, etc.

The BC engine 166 can be implemented as an individual controller, for example, which reads/writes data to the BC memory 160 and/or executes a bus sequence of set of bus controller commands stored in the BC functional logic 162 and the PLD module interface logic 164. As described herein, The BC Sequence can be preloaded in a given PLD functional module and/or stored in externally interfaced memory devices. During operation, the Bus controller 152 is configured to decode a given BC command in an executed BC command sequence and to perform predefined functions as per the command. In this manner, the BC engine 166 can operate as a sequence engine.

Figure 2:
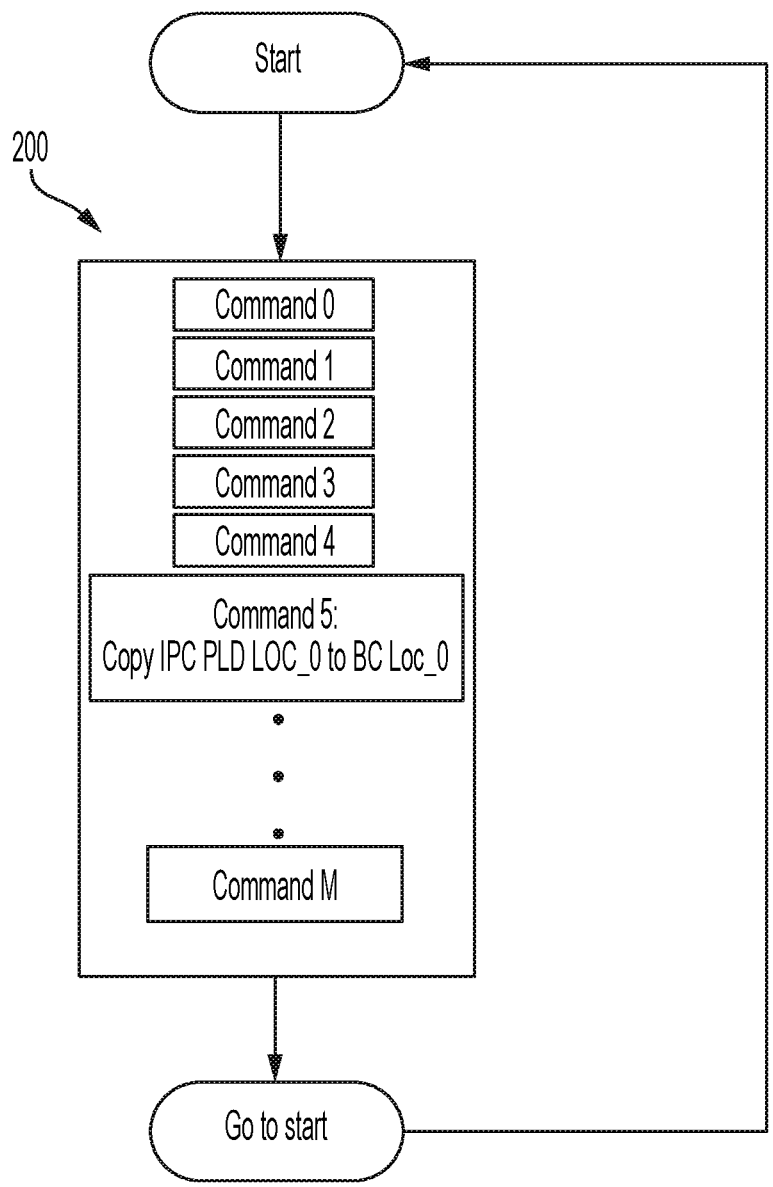
FIG. 2 illustrates a command sequence executable by a bus controller module included in the microprocessor-PLD hybrid architecture of FIG. 1 in accordance with embodiments.

FIG. 2 illustrates a command sequence 200 including a plurality of BC commands (1-N) executable by the Bus controller 152 according to a non-limiting embodiment. As described herein, the Bus controller 152 can initiate execution of the command sequence in response to detecting an "event" or "trigger" by one of the PLD module 154a-154n, execute the command sequence (e.g. sequentially processes the BC commands 1-N) according to a BC command execution rate such as, for example, 1 clock cycle set at about 40 megahertz (MHz) According to a non-limiting embodiment, the BC command sequence 200 can include reading of a newly inserted BC command by the IPC PLD module 154' based on a µP-PLD read-write sequence. The execution of the command sequence 200 can include processing one operation or command from a set number of operations or commands per clock cycle to facilitate command sequence execution data and transfer data between memory locations of the bus controller 152 and any of the pages (i.e., the PLD modules) in the paged memory architecture. The command sequence can include BC command that instructs copying inserted BC command from IPC PLD location (e.g., Location 0) to the BC controller module 152 address location (e.g., Location 0), along with other set of instructions for data transfer between PLD module 154a-154n. For example, the IPC PLD module 154' can generate and insert a BC command based on a primary μP-PLD read-write operation. In at least one non-limiting embodiment, the BC sequence repetition rate is substantially higher than that of the IPC interface rate, which avoids losing or missing a BC command generated from the IPC PLD module 154'. For example, the BC sequence repetition rate can be expressed as: BC Cmd Exe rate/M>>IPC Rate.

Referring again to FIG. 1, the PLD modules 154a-154n each includes a PLD engine 157, which supports a memory unit 151, fundamental logic 153, and BC interface logic 155. The PLD module 157 can be implemented as an individual functional module uses the input data and configuration data from the memory 151 and stores the result back to memory 151. The memory unit 151 includes a plurality of individual memory locations. Each memory location is assigned a unique address and is configured to store data (e.g., 32 bits) based on write commands, for example those generated by the IPC PLD module 154', delivered by the BC PLD module 152, and to read out stored data based on read commands, for example, those generated by the IPC PLD module 154', delivered by the BC PLD module 152. The functional logic 153 can perform various functional operations on data stored in the memory unit 151 such as, for example, various arithmetic and/or computational operations associated with the PLD application and/or I/O device type, data encoding/decoding, etc. The bus control interface logic 155 provides the PLD modules 154a-154n with information pertaining to the controller input/output interface between the PLD modules 154a-154n and the Bus controller 152, including interface input and/or output addresses, read/write timing parameters, etc.

According to a non-limiting embodiment, at least one of the PLD modules can serve as an IPC PLD module 154'. The IPC PLD module 154' can operates as a primary PLD module that performs the primary data exchange and IPC functionalities, while the remaining 154a-154n operate as secondary PLD modules that perform secondary data exchange IPC functionalities. The primary data exchange and IPC functionality can include generating an appropriate series of BC commands in reference to received command. The primary data exchange and IPC functionalities can also include placing the generated command and received transfer data in a predefined internal memory and indicating to generated command and received transfer data to the bus controller 152.

The IPC PLD module 154' communicates directly with the IPC microprocessor 102 via the IPC interface 104 to exchange various IPC interface signals, while the remaining PLD modules 154a-154n indirectly communicate with the IPC microprocessor 102 (e.g., via the Bus controller 152 and the IPC PLD module 154'). The IPC interface signals and data can be transferred over the IPC interface 104 according to an IPC interface rate, e.g., about 500 kilohertz (kHz). As described herein, the IPC interface 104 can be implemented as a 4-signal (or 4-wire) SPI interface, which achieves the targeted interface speed, bi-directional data transfer capability, scalability, number interfacing signals of the architecture 100. The SPI interface signals include a clock signal (referred to as "Clock"), a serial data input signal (SDI—also known as primary output-secondary input (POSI)), a serial data output signal (SDO—also known as primary input-secondary output (PISO)), and a chip selection signal (CS) signals. Accordingly, the primary IPC microprocessor 102 can drive the SPI clock signal, while then transmitting data using the SDI signal and receiving data using SDO signal in reference to clock edges of the clock signal. The chip selection (CS) signal from the primary IPC microprocessor 102 indicates the start and end of data transfer and reception of data from the primary-secondary data exchange. According to a non-limiting embodiment, the start and end of data transfer and reception of data between the primary IPC microprocessor 102 and a given PLD module 154a-154n can serve as an "event" or "trigger" used to control (e.g., start or end) execution of the BC command sequence.

As described herein, the IPC microprocessor 102 and the IPC PLD module 154' communicate directly with one another via the IPC interface 104. The IPC PLD module 154' relays commands and data received from the IPC microprocessor 102 to the Bus controller 152, and relays commands and data received from the Bus controller 152 to the IPC microprocessor 102. Accordingly, the IPC microprocessor 102 can initiate read-write sequence including IPC command words, and then generate a set of data to that is delivered to the IPC PLD module 154'. The IPC command word specifies the read or write operation, the PLD module page number and the number of words to be read/written. The IPC PLD module 154'.generates the equivalent BC command word for the Bus controller 152, and in turn the Bus controller 152 performs the specified read/write operation according to the PLD module page number.

When performing a write operation, the primary data word generated by the primary microprocessor 102 contains the data to be written to a target PLD module 154a-154n. When performing a read operation, the primary data word contains an acknowledgement for successful reception of data in case of read operation. The data word generated by IPC PLD module 154' contains the expected PLD module data included in the PLD modules 154a-154n and error correcting encoded data at the end of the transmission in case read operation and acknowledgement for successful reception of data in case of write operation. The expected PLD module data can be determined by the target PLD module 154a-154n based on its defined PLD functional logic 153. Accordingly, the command/data word integrity and high rate of successful reception is guaranteed by implementing appropriate error coding and transmission mechanism, which can be communicated and acknowledged immediate after a successful data exchange of a command and corresponding data between the primary microprocessor 102 and the target PLD module 154a-154n via the IPC PLD module 154'.

In at least one a non-limiting embodiment, the target PLD module 154a-154n can output a unsuccessful command-data reception signal, which indicates a fault in the target PLD module 154a-154n and/or the Bus controller 152. Accordingly, the primary microprocessor 102 can read this fault status periodically or prior to initiation of a new command-data write/read sequence and take appropriate action as per the application defined fault management methods.

Figure 3A:
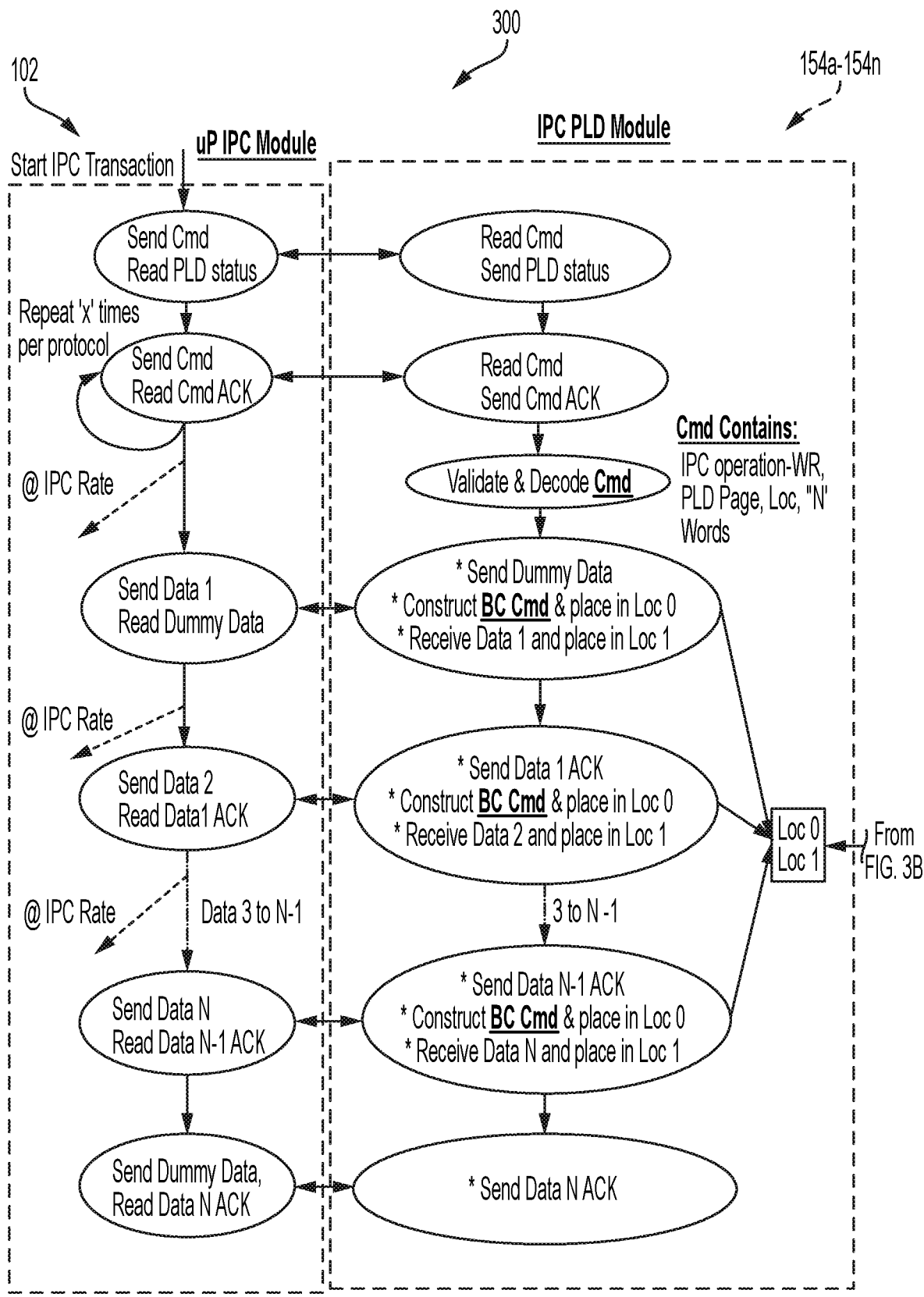
FIGS. 3A-3B is a diagram depicting an IPC data write operation performed by the microprocessor-PLD hybrid architecture shown in FIG. 1 according to a non-limiting embodiment of the present disclosure.
Figure 3B:
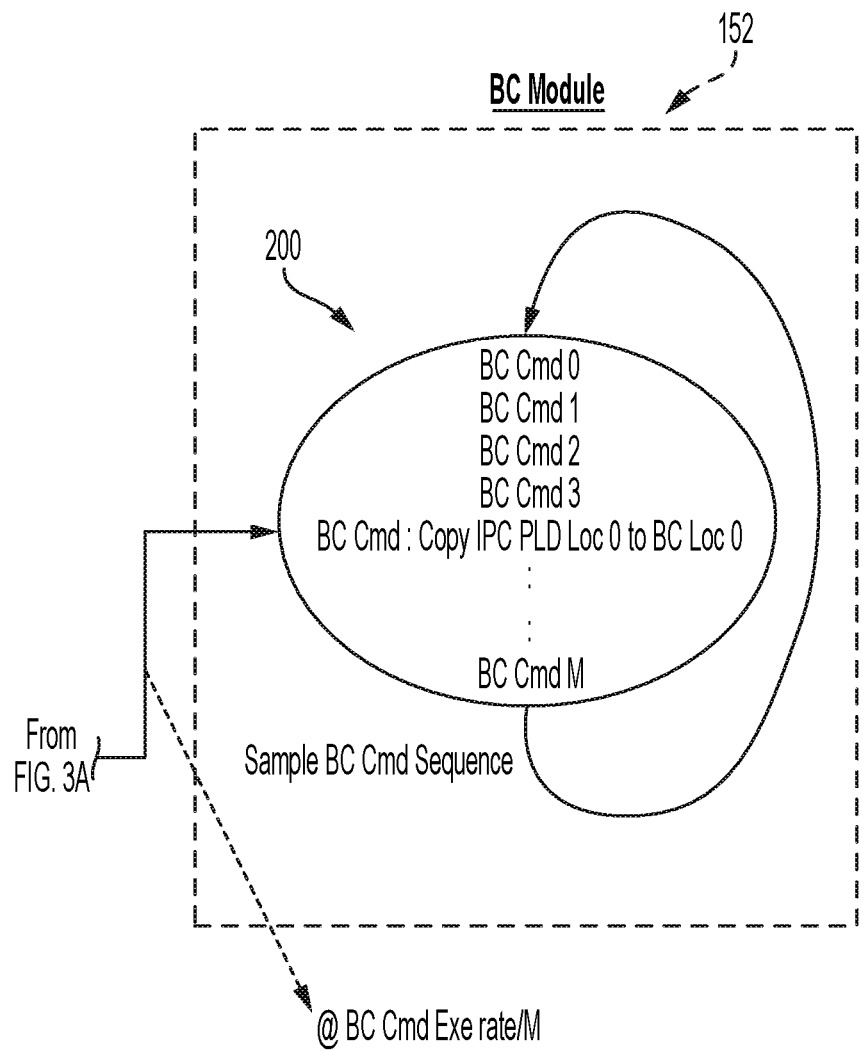
Figure 4A:
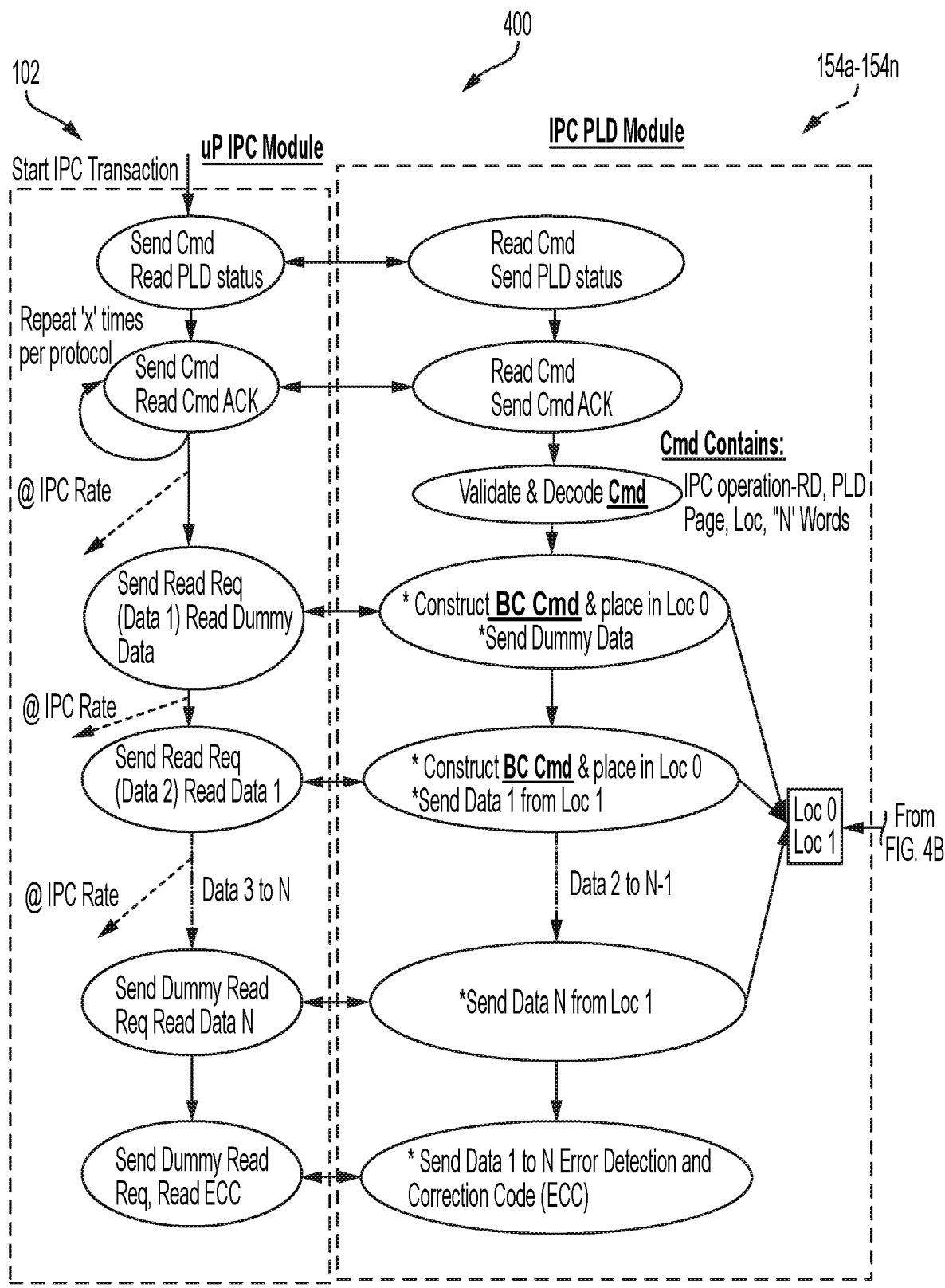
FIGS. 4A-4B is a diagram depicting an IPC data read operation performed by the microprocessor-PLD hybrid architecture shown in FIG. 1 according to a non-limiting embodiment of the present disclosure.
Figure 4B:
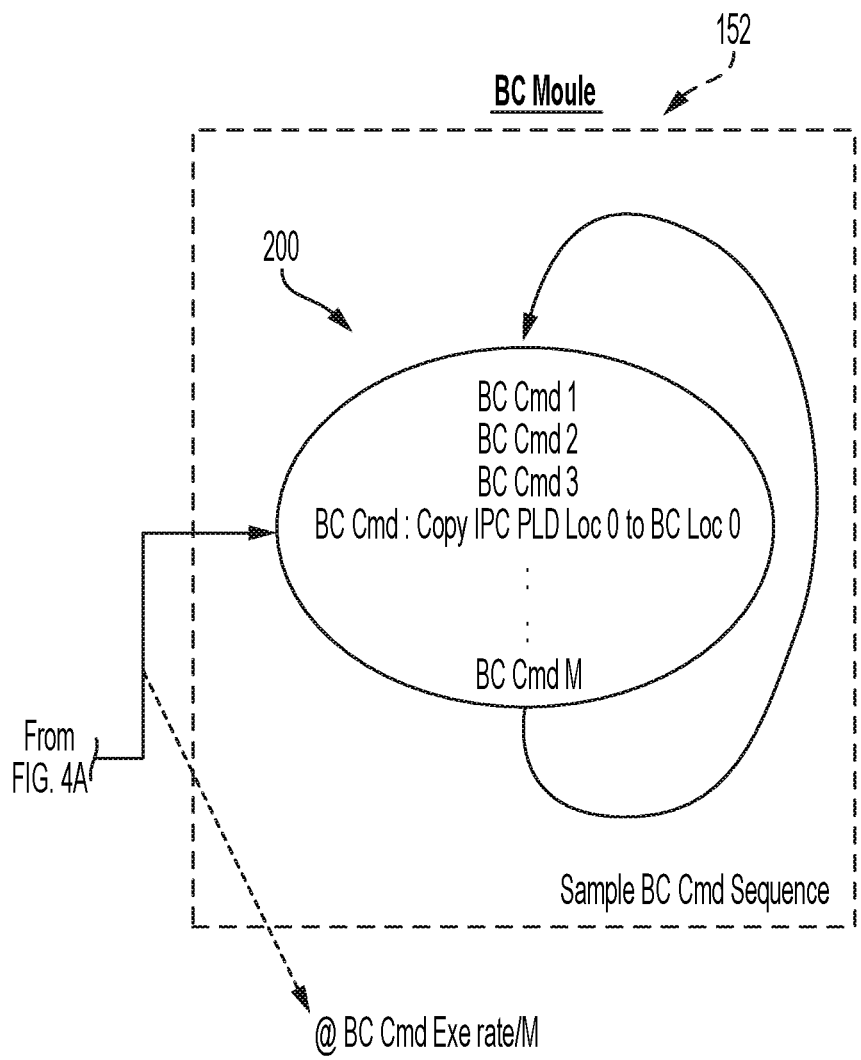

Turning now to FIGS. 3 and 4, data flow diagrams 300 and 400 depict the functional operation of the 100 according to non-limiting embodiment of the present disclosure. FIGS. 3A-3B depict a data flow diagram 300 illustrating an IPC data write operation performed by the microprocessor-PLD hybrid architecture 100 according to a non-limiting embodiment of the present disclosure, while FIGS. 4A-4B depicted a data flow diagram 400 illustrating an IPC data read operation performed by the microprocessor-PLD hybrid architecture 100.

The IPC data write function 300 (see FIGS. 3A-3B) and the data write function 400 (see FIGS. 4A-4B) can both be described according to the following operations:

(1) The primary IPC microprocessor 102 initiates read-write sequence including command and data at a predefined IPC interface rate set in the primary IPC μP module 106;

(2) On successful reception of command, the secondary IPC PLD module 154' decodes the command and extract type of operation (read/write), PLD module page address, memory location, number of words to be written/read;

(3) The IPC PLD module 154' generates equivalent BC command and store it in a first predefined location (e.g. Location 0) of the IPC PLD module;

(4) In case of write operation, IPC PLD module 154' generates an equivalent BC command to copy the data from the predefined location (e.g. Location 1) of the IPC PLD module 154' to a specific PLD module location (see FIG. 2);

(5) In case of read operation, IPC PLD module 154' generates an equivalent BC command to copy the data from a specific PLD module location to the predefined location of IPC PLD module 154' (see FIGS. 4A-4B);

(6) The IPC PLD module 154' stores/transmits the data word from a second predefined location (e.g., Location 1) in reference to write/read operation;

(7) In case of write operation, the data followed by the command is stored in the predefined memory location (e.g., Location 1) of IPC PLD module 154' after checking data integrity (see FIGS. 3A-3B);

(8) In case of read operation, on successful reception of an acknowledgment word from the primary IPC microprocessor 102 for a previous transmitted word for the IPC PLD module 154', the IPC PLD module 154' transmits the data from the predefined memory location of IPC PLD module 154' (see FIGS. 4A-4B);

(9) The Bus controller 152 reads the newly inserted BC command as per the BC Sequence and places it in its BC Page (e.g., memory 160) at Location 0, which will be decoded;

(10) The Bus controller 152 performs a corresponding action or function as per the decoded command stored in its BC Page (e.g., memory 160) at Location 0;

(11) As per the decoded newly inserted command, the Bus controller 152 performs a write/read operation to write/read the data word from/to the predefined location (e.g., Location 1) of the IPC PLD module 154':

(a) In case of write operation, the Bus controller 152 reads the data from the predefined location of IPC PLD module 154';

(b) In case of read operation, the Bus controller 152 writes the data to the predefined location of IPC PLD module 154' to the PLD modules 154a-154n per the decoded command;

(11) The primary microprocessor 102 repeats operation (1) until completion of number of words as defined in the command;

(12) Similarly, the secondary PLD IPC module 154' repeats operation (2) and operation (8) until completion of number words as defined in the command; and

(13) Any fault detected during the read-write operation (e.g. by the primary microprocessor 102) will be handled as per the application specific fault handling mechanism.

The corresponding structures, materials, acts, and equivalents of all means or step-plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A microprocessor-PLD hybrid architecture comprising:
an inter-processor communication (IPC) microprocessor configured to output a data read command configured to initiate a data read operation that obtains first data or to output a data write command configured to initiate a data write operation that stores second data; and
a programmable logic device (PLD) in signal communication with the IPC microprocessor via an IPC interface, the PLD comprising:
 a plurality of PLD modules, each of the PLD modules including PLD memory configured to store data; and
 a bus controller in signal communication with the plurality of PLD modules via a plurality of PLD interfaces, the bus controller including a bus memory unit configured to store data and including a bus controller engine configured to sequentially execute a set of bus controller instructions,
 wherein the bus controller reads the first data from a target PLD module from among the plurality of PLD modules in response to receiving the data read command, and transfers the first data to the IPC microprocessor, and
 wherein the bus controller receives the second data from the IPC microprocessor, and stores the second data in a target PLD module from among the plurality of PLD modules in response to receiving the data write command.

2. The microprocessor-PLD hybrid architecture of claim 1, wherein at least one of the plurality of PLD modules operates as an IPC PLD module configured to communicate directly with the IPC microprocessor and the bus controller, while remaining PLD modules among the plurality of PLD modules indirectly communicate with the IPC microprocessor.

3. The microprocessor-PLD hybrid architecture of claim 2, wherein the bus controller transfers data from the target PLD module to the IPC PLD module according to the data read command and transfers data from the IPC PLD module to the target PLD module according to the data write command.

4. The microprocessor-PLD hybrid architecture of claim 3, wherein the bus controller executes a command sequence in response to receiving trigger event from a given PLD module among the plurality of PLD modules.

5. The microprocessor-PLD hybrid architecture of claim 3, wherein executing the command sequence includes sequentially executing each command included in the command sequence according to a command execution rate.

6. The microprocessor-PLD hybrid architecture of claim 5, wherein the IPC interface operates at an IPC interface rate, and the command execution rate is greater than the IPC interface rate.

7. The microprocessor-PLD hybrid architecture of claim 6, wherein the IPC microprocessor outputs a read acknowledgement signal to the target PLD module in response to successfully receiving the first data, and wherein the target PLD module outputs a write acknowledgement signal to the IPC microprocessor in response to successfully storing the second data.

8. The microprocessor-PLD hybrid architecture of claim 7, wherein the IPC microprocessor outputs the second data to the target PLD module in response to initiating the data write operation, and wherein the target PLD module outputs the first data and error correcting encoded data corresponding of the first data to the IPC microprocessor in response to initiating the data read operation.

9. The microprocessor-PLD hybrid architecture of claim 8, wherein:
in response to initiating the data read operation the IPC PLD module delivers data from the bus controller module and error correcting encoded data to the IPC microprocessor; and
in response to initiating the data write operation the IPC PLD module delivers the second data from the IPC microprocessor to the bus controller.

10. The microprocessor-PLD hybrid architecture of claim 9, wherein:
in response to initiating the data read operation the bus controller delivers the first data from target PLD module to the IPC PLD module, and delivers the read acknowledgement signal from the IPC PLD module to the target IPC PLD module; and
in response to initiating the data write operation the bus controller delivers the second data from the IPC PLD module to the target PLD module, and delivers the write acknowledgement signal from the target PLD module to the IPC PLD module.

11. A method of controlling a microprocessor-PLD hybrid architecture comprising:
outputting, from an inter-processor communication (IPC) microprocessor, one of a data read command configured to initiate a data read operation to obtain first data, or a data write command configured to initiate a data write operation to store second data;
arranging a plurality of individual PLD modules in a programmable logic device (PLD) in signal communication with the IPC microprocessor via an IPC interface;
sequentially executing a set of bus controller instructions by a bus controller and exchanging data between the bus controller and the plurality of PLD modules via a plurality of PLD interfaces in response to executing the instructions;
in response to receiving the data read command, reading, by the bus controller, first data from a target PLD module from among the plurality of PLD modules and transferring the first data to the IPC microprocessor; and
in response to receiving the data write command, receiving, by the bus controller, the second data from the IPC microprocessor and storing the second data in a target PLD module from among the plurality of PLD modules.

12. The method of claim 11, further comprising operating at least one of the plurality of PLD modules as an IPC PLD module configured to communicate directly with the IPC microprocessor and the bus controller, while remaining PLD modules among the plurality of PLD modules indirectly communicate with the IPC microprocessor.

13. The method of claim 12, further comprising:
transferring data by the bus controller transfers data from the target PLD module to the IPC PLD module according to the data read command; and
transfers data by the bus controller from the IPC PLD module to the target PLD module according to the data write command.

14. The method of claim 13, further comprising executing, by the bus controller, a command sequence in response to receiving trigger event from a given PLD module among the plurality of PLD modules.

15. The method of claim 13, wherein executing the command sequence includes sequentially executing each command included in the command sequence according to a command execution rate.

16. The method of claim 15, further comprising:
operating the IPC interface at an IPC interface rate, wherein the command execution rate is greater than the IPC interface rate.

17. The method of claim 16, further comprising:
outputting, by the IPC microprocessor, a read acknowledgement signal to the target PLD module in response to successfully receiving the first data; and
outputting, by the target PLD module, a write acknowledgement signal to the IPC microprocessor in response to successfully storing the second data.

18. The method of claim 17, further comprising:
further comprising outputting, by the IPC microprocessor, the second data to the target PLD module in response to initiating the data write operation; and
outputting, the target PLD module, the first data and error correcting encoded data corresponding of the first data to the IPC microprocessor in response to initiating the data read operation.

19. The method of claim 18, further comprising:
delivering data from the bus controller module and error correcting encoded data to the IPC microprocessor in response to initiating the data read operation the IPC PLD module; and
delivering the second data from the IPC microprocessor to the bus controller in response to initiating the data write operation the IPC PLD module.

20. The method of claim 19, wherein:
in response to initiating the data read operation the bus controller delivers the first data from target PLD module to the IPC PLD module, and delivers the read acknowledgement signal from the IPC PLD module to the target IPC PLD module; and
in response to initiating the data write operation the bus controller delivers the second data from the IPC PLD module to the target PLD module, and delivers the write acknowledgement signal from the target PLD module to the IPC PLD module.

* * * * *